United States Patent [19]

Siebler

[11] Patent Number: 4,636,003
[45] Date of Patent: Jan. 13, 1987

[54] MOTOR-VEHICLE SEAT WITH BACKREST WHICH CAN BE SWUNG FORWARD OUT OF A POSITION OF USE

[75] Inventor: Helmut Siebler, Fellbach, Fed. Rep. of Germany

[73] Assignee: Daimler-Benz Aktiengesellschaft, Stuttgart, Fed. Rep. of Germany

[21] Appl. No.: 714,209

[22] Filed: Mar. 21, 1985

[30] Foreign Application Priority Data

Mar. 21, 1984 [DE] Fed. Rep. of Germany ....... 3410262

[51] Int. Cl.$^4$ .............................................. B60N 1/02
[52] U.S. Cl. .................................... 297/336; 297/340; 297/378
[58] Field of Search ............... 297/336, 335, 331, 378, 297/379, 380, 340; 5/43

[56] References Cited

U.S. PATENT DOCUMENTS

| | | | |
|---|---|---|---|
| 865,327 | 9/1907 | Barrett | 297/380 |
| 2,611,421 | 9/1952 | Hathaway | 297/378 X |
| 2,685,326 | 8/1954 | Lehman | 297/380 |
| 2,926,948 | 3/1960 | Koplin et al. | 297/378 X |
| 2,926,950 | 3/1960 | Hooverson | 297/378 X |
| 3,258,787 | 7/1966 | Emmons et al. | 5/43 |
| 4,368,916 | 1/1983 | Blasin | 297/378 |
| 4,484,776 | 11/1984 | Gokimoto et al. | 297/379 |

FOREIGN PATENT DOCUMENTS 538425 3/1922 France ............................ 297/380

Primary Examiner—Francis K. Zugel
Attorney, Agent, or Firm—Barnes & Thornburg

[57] ABSTRACT

A vehicle passenger seat located adjacent to the driver is equipped with a backrest and can be swung past the dashboard of a motor vehicle by first pivoting the backrest forward, a rearward sliding movement being superimposed on the pivoting movement because a bracket receiving the backrest pivotably is provided with a guide device and a displacement of the bracket together with the backrest is produced by means of a supporting lever arrangement.

8 Claims, 6 Drawing Figures

MOTOR-VEHICLE SEAT WITH BACKREST WHICH CAN BE SWUNG FORWARD OUT OF A POSITION OF USE

The invention relates to a motor-vehicle seat with a backrest which can be swung forward out of the position of use and which is mounted so as to be laterally pivotable on a bracket connected to the seat-cushion frame, there being a guide device by means of which, when the backrest is pivoted, the point of articulation of the backrest on the bracket is displaced in the longitudinal direction of the vehicle via a lever arrangement connected to the backrest.

A motor-vehicle seat of this type, in which, to make it easy to reach the rear seats in a two-door passenger car when the backrest is swung forward, the entire seat is moved only temporarily in the direction of the dashboard, is known from German Auslegesschrift No. 1,013,535. However, because of the greatly restricted view to the right, it is not advisable to maintain the tilted position during driving.

Particularly with regard to delivery vehicles provided with a seat adjacent to the driver and access to the loading space from the driver's cab, it is known to tilt the adjacent seat forward about a front pivot axis, the seat underframe also being swung in at the same time, thus ensuring a wide passage which allows even relatively large articles to be loaded and unloaded from the co-driver's side. Seats of this type have heretofore been used without headrests, so that, when the entire seat has been tilted, despite the fact that the backrest has come up against the dashboard, there has still been a sufficient passage width and a good view to the right has been provided during driving. Since such seats are now provided with headrests, these butt against the front screen even after a relatively small pivoting angle when the seat is swung forward, so that the passage width obtainable and the view to the right are impaired to an extent which is no longer acceptable.

The object of the invention is to provide a way in which it is possible to use, in an operationally reliable way, seats adjacent to the driver equipped with headrests in vehicles of the type described, and to hinge them in such a way that, in the inoperative position of the seat, a sufficiently large passage width is obtained, at the same time with the view to the right being improved substantially.

It is a further object of the invention to have a motor-vehicle seat with a backrest which can be swung forward out of the position of use and which is mounted so as to be laterally pivotable on a bracket connected to a seat-cushion frame, there being a guide device by means of which the point of articulation of the backrest on the bracket is displaced in the longitudinal direction of the vehicle via a lever arrangement connected to the backrest, characterized in that the guide device is assigned to the bracket in such a way that the latter is arranged so as to be displaceable relative to the seat-cushion frame, and in that, when the backrest is pivoted out of the position of use, the backrest together with the bracket is moved to the rear via at least one supporting lever articulated on the seat frame and fixed to the backrest and wherein in the inoperative position forms, without the position of the headrest having to be changed, the initial position for swinging the entire seat about a front pivot axis in the way known per se, the seat underframe at the same time being transferred into an extended position providing a passage width.

In a preferred exemplary embodiment of the invention, a guide device is designed as a slot which is made in a bracket and into which projects a pivot pin assigned to the seat cushion and belonging to an associated supporting lever and a locking pin arranged at a distance from the pivot pin and intended for a locking lever which prevents a sliding movement of the bracket in the position of use of the seat and which is pivotable against spring force. In this way, the guide parts engaging into the slot are also used to perform bearing and supporting functions and serve as end stops.

It is a further object of the invention to have a motor-vehicle seat with a backrest which can be swung forward out of the position of use and which is mounted so as to be laterally pivotable on a bracket connected to a seat-cushion frame, having a guide device by means of which the point of articulation of the backrest on the bracket is displaced in the longitudinal direction of the vehicle via a lever arrangement connected to the backrest, characterized in that the guide device is assigned to the bracket in such a way that the latter is arranged so as to be displaceable relative to the seat-cushion frame, and when the backrest is pivoted out of the position of use, the backrest together with the bracket is moved to the rear via at least one supporting lever consisting of two portions articulated to one another and to the seat frame and fixed to the backrest. The guide device being a slot in the bracket and into which projects a pivot pin assigned to the seat cushion belonging to the associated supporting lever and a locking pin for preventing sliding movement of the bracket in the position of use of the seat arranged at a distance from the pivot pin, and further characterized in that a locking lever pivotable against a spring force, rigidly provided with an axially offset locking nose is brought into resilient engagement with a pin connected to the backrest, when the backrest is transferred from the inoperative position into the position of use, wherein the pivoting movements of the locking lever and of the locking nose are transmitted, via a shaft extending in the transverse direction of the vehicle, to a mirror-image locking arrangement on the other side of the seat.

These and other objects, features, and advantages of the present invention will become more apparent from the following description when taken in connection with the accompanying drawings which show, for the purposes of illustration only, two embodiments in accordance with the present invention, and wherein.

Figure 1:
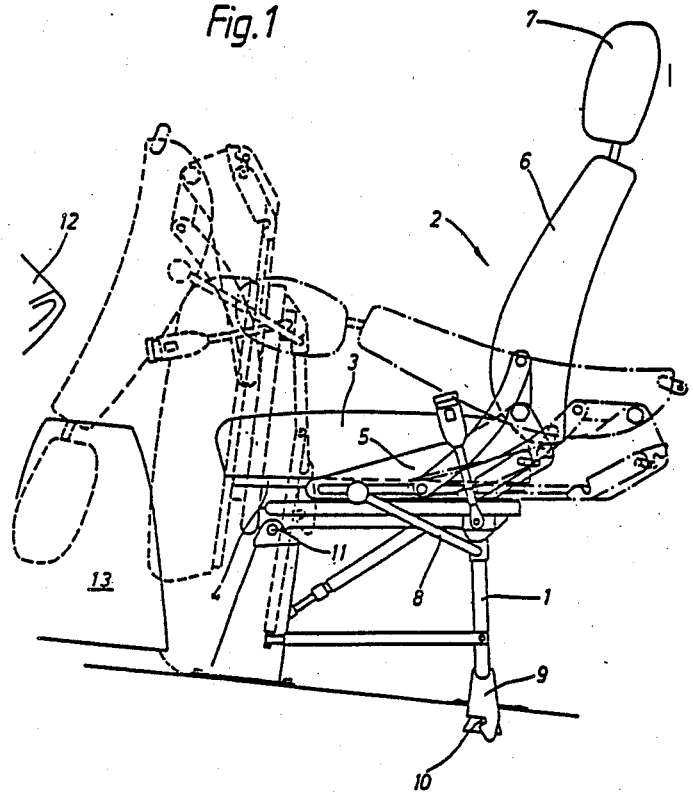
FIG. 1 shows a co-driver's side seat according to the invention in its three possible positions.

Referring now to the drawings wherein like reference numerals are used to designate like parts and more particularly to FIG. 1 wherein a motor-vehicle seat 2 resting on a hinged seat underframe 1, consists essentially of a seat cushion 3 with a seat-cushion frame 4 receiving a bracket 5 which is displaceable in the longitudinal direction of the vehicle and on which a backrest 6 is articulated. The latter is provided with a headrest 7 adjustable in terms of height and inclination and can be swung forward in a way described in more detail later, the backrest 6 experiencing during the pivoting movement a controlled rearward displacement relative to the seat cushion 3, thereby assuming the position represented by dot-and-dash lines.

When a lever 8 mounted on the seat underframe 1 is pivoted, a locking lever 9 located on the floor is disengaged from an associated locking catch 10 fixed to the vehicle, the entire seat 2 can be moved forward about a front pivot axle 11 into its position represented by broken lines, in which the seat underframe 1 assumes an extended position, thus providing a large passage width, so that, in particular, a convenient passage to the rear loading space (not shown) from the co-driver's side is obtained. During this pivoting operation, even when the headrest 7 is fully extended, there is no danger that it will come up against the dashboard 12 indicated, and the centrally arranged casing 13 covering the engine (not shown) at the top also does not impede the pivoting operation.

Figure 2:
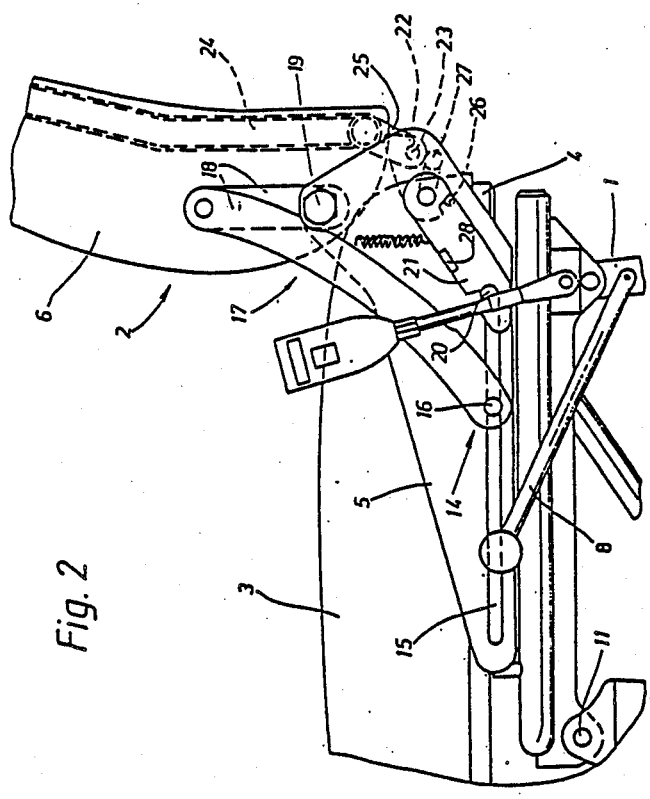
FIG. 2 shows the region of the guide device on a larger scale, in the operating position of the seat.

It can be seen in more detail from FIG. 2, which shows the backrest 6 in its position of use, that the bracket 5 is provided with a guide device 14 consisting essentially of a slot 15, into which engages the pivot pin 16 assigned to the seat cushion and intended for a lever arrangement 17. The latter consists of a supporting lever 18 which has two portions articulated to one another and which at the same end as the backrest is assigned rigidly to the point of articulation 19 of the backrest 6.

Figure 6:
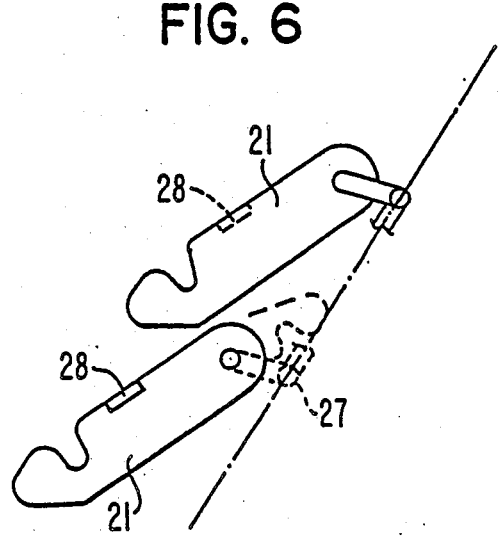
FIG. 6 shows the arrangement according to FIG. 1 wherein the actuating lever of the locking lever on one side of the seat activates a mirror image locking lever arrangement on the other side of the seat.

The slot 15 also has engaging in it a locking pin 20 which projects from the seat-cushion frame 4 and on which engages a spring-loaded locking lever 21 which is equipped with a rigidly connected locking nose 22 offset in the transverse direction of the vehicle and engaged with a pin 23. The latter projects from a plate 25 connected rigidly to the backrest frame 24. Thus, in the position of use of the motor-vehicle seat 2 as illustrated, double locking of the position of the backrest 6 is obtained. The locking lever 21 is mounted pivotably on the bracket 5, and a peg 26 projecting from the inner face of the bracket 5 and interacting with the locking nose 22 limits the pivoting travel. A bent shaft 27 connected rigidly to the locking lever 21 and extending in the transverse direction of the vehicle is used to transmit the pivoting movements to a mechanism arranged as a mirror-image on the opposite side of the seat as shown schematically in FIG. 6.

Figure 3:
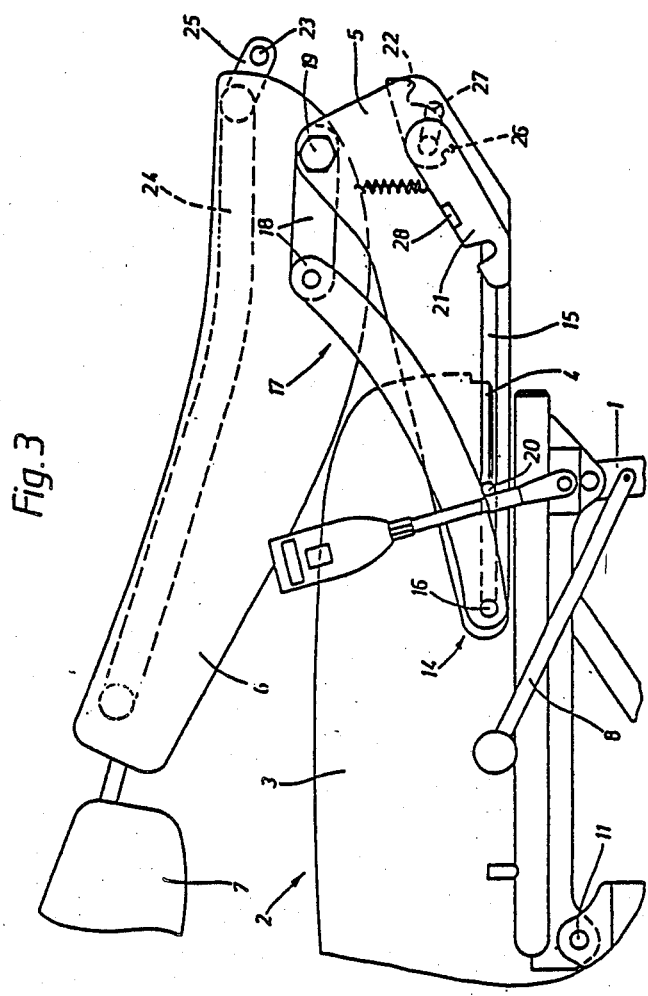
FIG. 3 shows the region of the guide device, likewise on a larger scale, with the backrest swung down.

When the locking lever 21 is swung back as a result of pressure on a button 28 attached to it, the locking lever 21 is disengaged from the locking pin 20 and the locking nose 22 is disengaged from the pin 23, so that the backrest 6 can now be pivoted forward. During this operation, the backrest 6 is supported by means of the two portions of the supporting lever 18 which are articulated to one another, so that a rearward sliding movement of the bracket 5 is superimposed on the pivoting movement executed about the point of articulation 19, and when this operation has ended the backrest 6 adopts the tilted position shown in FIG. 3. When the backrest 6 is raised again from this position, the locking lever 21 and the locking nose 22 engage automatically when the position of use is reached.

Figure 4:
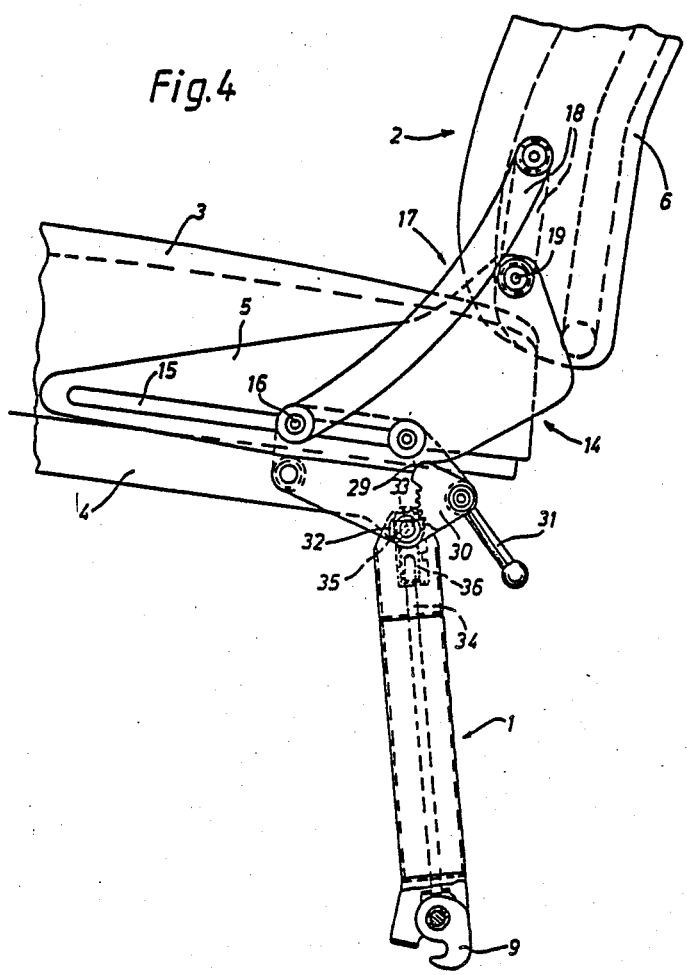
FIG. 4 is a second embodiment having a locking means, controlled via a toothed segment, of the bracket and of the locking lever at the base, in the position of the use of the motor vehicle seat.
Figure 5:
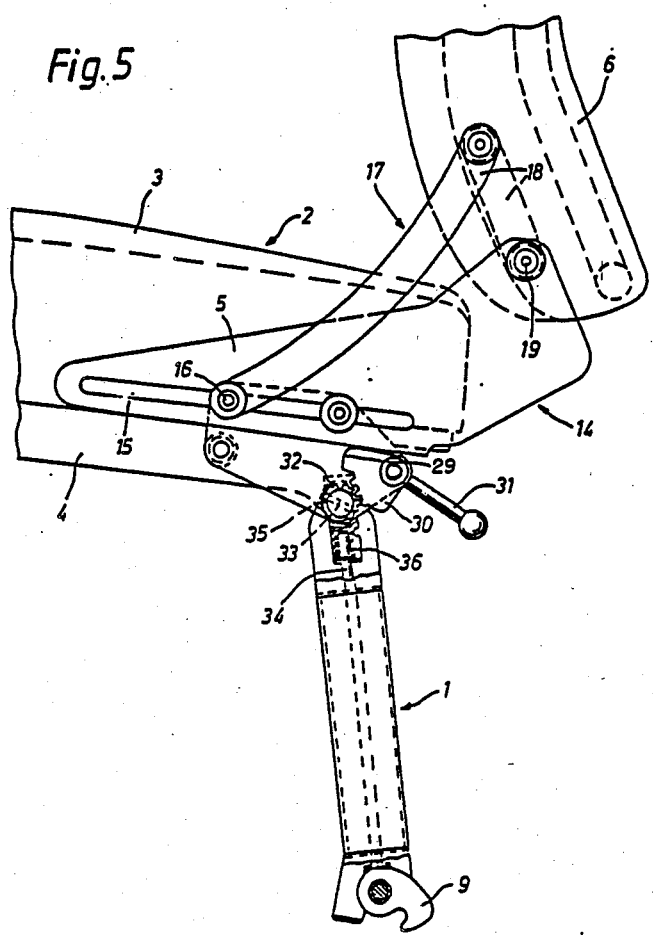
FIG. 5 is the arrangement according to FIG. 4 when the locking means is released and the backrest is partly swivelled forward.

In the embodiment according to FIGS. 4 and 5, where the sequence of movements takes place in the described manner, the bracket 5, when the backrest is lifted up, supports itself at a stop 29 of a toothed segment 30 pivotally at the seat frame 1. Said toothed segment 30 is firmly connected with an operating lever 31. An additional toothed segment 32 engages with the first segment 30. Said additional segment 32 is equipped with a follower pin 33. Said follower pin 33 engages a spring 36 in window 35 arranged on the top side of a connecting rod 34 wherein the lower end of the connecting rod 34, loaded by the spring 36 in downward direction, is coupled at the locking lever 9 on the floor.

When the operating lever 31, as shown in FIG. 5, is swivelled upward against the force of the spring 36, the stop 29 disengages from the bracket 5, and by means of the simultaneously occurring upward movement of the connecting rod 34, the locking lever 9 swings to the right, so that the backrest 6 can be swivelled to the front and the seat frame 1 can be folded in.

During a movement of the bracket 5 toward the rear, the stop 29, in a prestressed condition, rests against the bottom side of the bracket 5 in order to, at the end of a movement in the opposite direction, for the changing of the motor vehicle seat into its condition of use by an automatically occurring swivelling, cause a supporting of the bracket 5 as well as a pivoting of the locking lever 9 into the locking position.

The pivoting movement caused by the operating lever 31, in a manner that is not shown, via a shaft extending in transverse direction of the vehicle, is transmitted to a locking arrangement on the other side of the seat that is arranged in a mirror-inverted manner, said locking arrangement affecting at least the assigned bracket.

While I have shown and described two embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A motor-vehicle seat with a backrest which can be swung forward out of the position of use and which is mounted so as to be pivotable forwardly about a lateral pivot on a bracket connected to a seat-cushion frame, there being a guide device by means of which the point of pivoting of the backrest on the bracket is displaced rearwardly relative to the seat cushion frame and in the longitudinal direction of the vehicle via a lever arrangement connected to the backrest, characterized in that the guide device is assigned to the bracket in such a way that the latter is arranged so as to be displaceable relative to the seat-cushion frame, and in that, when the backrest is pivoted out of the position of use, the backrest together with the bracket is moved to the rear via at least one supporting lever articulated on the seat frame and fixed to the backrest.

2. A motor-vehicle seat according to claim 1, characterized in that the guide device is a slot in the bracket and into which projects a pivot pin assigned to the seat cushion and belonging to the associated supporting lever and a locking pin arranged at a distance from the pivot pin and intended for a locking lever which prevents a sliding movement of the bracket in the position of use of the seat and which is pivotable against spring force.

3. A motor-vehicle seat according to claim 2, characterized in that the locking lever is provided with an axially offset locking nose which is connected rigidly to the locking lever and which is brought into resilient engagement with a pin connected to the backrest, when the backrest is transferred from the inoperative position into the position of use.

4. A motor-vehicle seat according to claim 3, characterized in that the pivoting movements of the locking lever and of the locking nose are transmitted, via a shaft extending in the transverse direction of the vehicle, to a mirror-image locking arrangement on the other side of the seat.

5. A motor-vehicle seat according to claim 1, wherein the supporting lever consists of two portions articulated to one another.

6. A motor-vehicle seat according to claim 2, wherein the supporting lever consists of two portions articulated to one another.

7. A motor-vehicle seat according to claim 3, wherein the supporting lever consists of two portions articulated to one another.

8. A motor-vehicle seat according to claim 4, wherein the supporting lever consists of two portions articulated to one another.

* * * * *